United States Patent [19]

Kaneyuki

[11] Patent Number: 4,730,515
[45] Date of Patent: Mar. 15, 1988

[54] DRIVE APPARATUS FOR ENGINE AUXILIARY EQUIPMENT

[75] Inventor: Kazutoshi Kaneyuki, Himeji, Japan

[73] Assignee: Mitsubishi Denki Kabushiki Kaisha, Tokyo, Japan

[21] Appl. No.: 776,863

[22] Filed: Sep. 17, 1985

[30] Foreign Application Priority Data

Sep. 25, 1984 [JP] Japan .................. 59-202261

[51] Int. Cl.$^4$ .................. F16H 3/74; F16H 15/50
[52] U.S. Cl. .................. 74/752 A; 74/191; 74/796
[58] Field of Search .......... 74/752 A, 796, 752 C, 74/191, 190.5, 856, 866, 752 D

[56] References Cited

U.S. PATENT DOCUMENTS

| | | | |
|---|---|---|---|
| 2,828,907 | 4/1958 | Oehrli | 74/796 |
| 3,108,497 | 10/1963 | Kashihara | 74/796 |
| 3,182,519 | 5/1965 | Grieshaber | 74/191 |
| 4,232,561 | 11/1980 | Kashihara et al. | 74/191 |
| 4,468,984 | 9/1984 | Castelli et al. | 74/191 X |

FOREIGN PATENT DOCUMENTS

| | | | |
|---|---|---|---|
| 595443 | 4/1960 | Canada | 74/796 |
| 2825730 | 1/1979 | Fed. Rep. of Germany | 74/191 |
| 5165 | 1/1979 | Japan | 74/191 |
| 47061 | 3/1982 | Japan | 74/796 |
| 57-13221 | 3/1982 | Japan . | |
| 58-86434 | 6/1983 | Japan . | |
| 58-200838 | 11/1983 | Japan . | |
| 151656 | 8/1984 | Japan | 74/796 |

Primary Examiner—Lawrence Staab
Assistant Examiner—David Novais
Attorney, Agent, or Firm—Leydig, Voit & Mayer

[57] ABSTRACT

A drive apparatus for engine auxiliary equipment comprises a drive pulley mounted on the crank shaft of an engine. The rotation of the axle of the drive pulley by the crank shaft is transmitted to the grooved body of the drive pulley by a planetary cone-type reduction gear. An output ring of the reduction gear can be moved along the surface of the planetary cones of the reduction gear by an hydraulic ram to change the reduction ratio. A pump driven by the rotation of the drive pulley pumps transmission oil sealed within the housing of the pulley to drive the hydraulic ram. The oil pressure applied to the ram is determined by the opening and closing of a solenoid valve, which is controlled by a controller in accordance with the operating conditions of the engine and the auxiliary equipment driven by the drive pulley. The reduction gear, the pump, the hydraulic ram, and the solenoid valve are housed within the drive pulley which is the same size as a conventional drive pulley.

7 Claims, 4 Drawing Figures

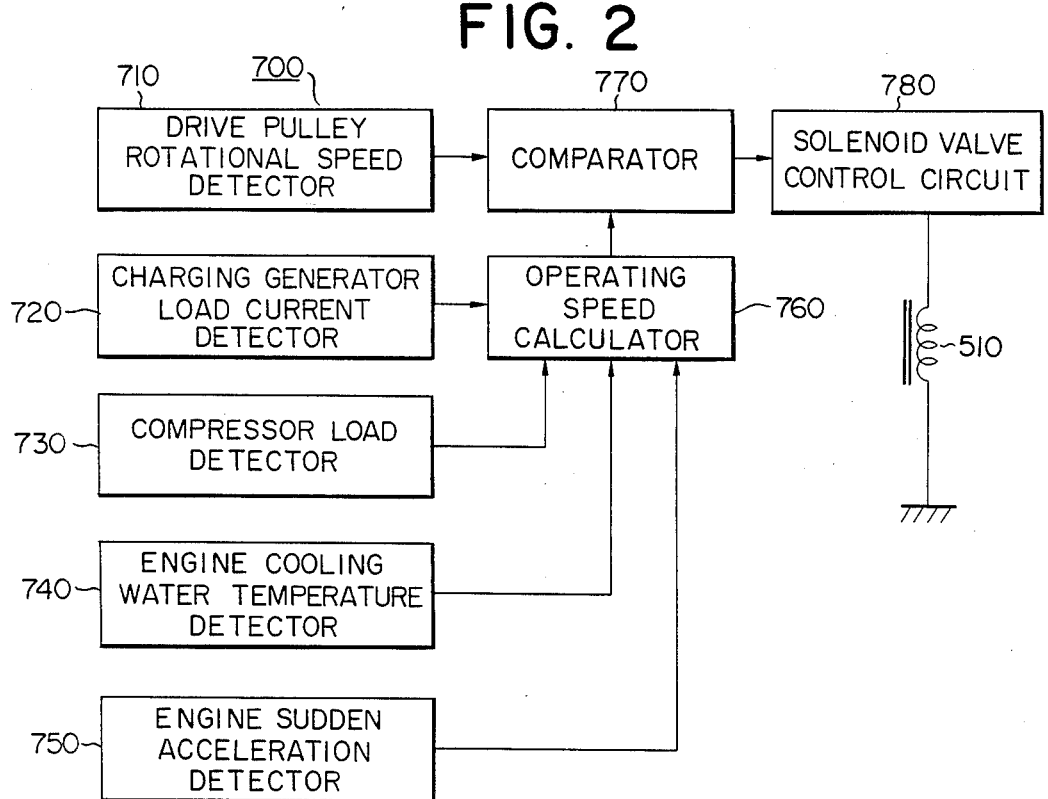
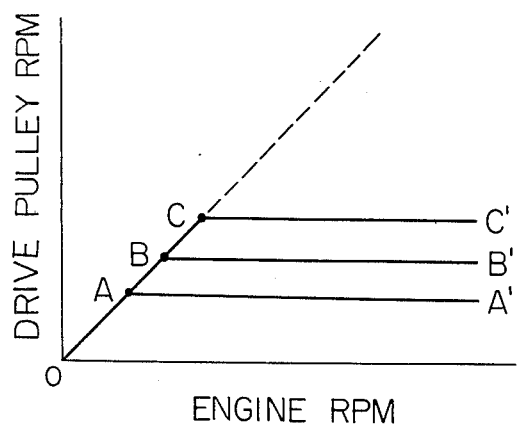
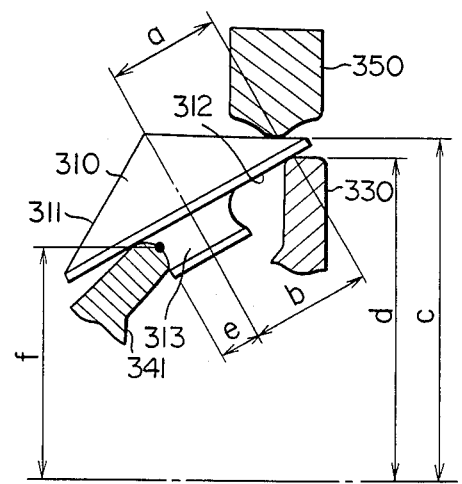

DRIVE APPARATUS FOR ENGINE AUXILIARY EQUIPMENT

BACKGROUND OF THE INVENTION

This invention relates to a drive apparatus for driving the auxiliary equipment for an engine of an automobile or other vehicle. More particularly, it relates to a drive apparatus which can drive auxiliary equipment at a speed independent of the speed of the engine.

In an engine for an automobile or other vehicle, auxiliary equipment such as alternators, water pumps, air conditioner compressors, and oil pumps for hydraulic steering are belt driven by a drive pulley provided on the end of the crank shaft. This auxiliary equipmemt is generally designed to be operated at speeds which are low compared to the operating speeds of the engine, and if driven at the same speed as the engine when the engine is running at high speeds, the operation of the equipment would produce considerable power losses. Therefore, means are generally provided for adjusting the speed of the drive pulley for the auxiliary equipment with respect to the rotational speed of the engine so that the auxiliary equipment can be operated at suitable speeds.

For example, Japanese Laid-Open Patent Application No. 58-200838 discloses a speed reduction apparatus for engine auxiliary equipment comprising a planetary reduction gear and a unidirectional clutch provided between an engine crank shaft and a pulley for auxiliary equipment, as well as a directly-coupled clutch comprising a hydraulic piston. At low engine speeds, the rotation of the crank shaft is transmitted directly to the pulley via the directly-coupled clutch. When the engine speed reaches a certain level, the directly-coupled clutch is disengaged, and the rotation of the crank shaft is transmitted to the pulley via the planetary reduction gear and the one-way clutch at a reduced speed.

However, there is a sudden change in the speed of the auxiliary equipment when the directly-coupled clutch is engaged or disengaged, which causes a shock to be imparted to both the engine and the auxiliary equipment. This shock reduces the stability of the automobile and imparts an unpleasant sensation to the driver. Furthermore, there are problems with the durability of the planetary gear reduction gear, and these problems can easily cause noise problems to develop. Thus, this apparatus is not practical. Also, as a planetary reduction gear is employed, the reduction ratio is constant.

Japanese Laid Open Utility Model Application No. 58-86434 discloses a variable speed drive apparatus for auxiliary equipment which utilizes two variable pitch pulleys. A variable pitch drive pulley is disposed on a crank shaft and a variable pitch driven pulley which is driven by the drive pulley with a belt is connected to auxiliary equipment which is to be driven. Each pulley comprises a stationary portion and a movable portion which can be moved towards and away from the stationary portion in the axial direction of the pulley by a hydraulic cylinder mounted on the drive pulley so as to change the effective pitch of the pulley, thereby adjusting the degree of reduction provided by the pulleys and controlling the speed of the auxiliary equipment driven by the driven pulley.

However, in this apparatus, a high pressure oil source is necessary to operate the hydraulic cylinder, and the structure of the hydraulic actuator for the hydraulic cylinder is complicated. Furthermore, the apparatus projects by a considerable amount in the axial direction of the crank shaft of the engine, and thus it is not suitable for automobiles having a limited installation space such as front wheel drive automobiles in which the engine is disposed sideways.

SUMMARY OF THE INVENTION

It is an object of the present invention to overcome the drawbacks of the apparatuses described above and to provide a drive apparatus for engine auxiliary equipment which enables the speed of engine auxiliary equipment to be changed in a smooth and silent manner without imparting shocks to the engine or the auxiliary equipment.

It is another object of the present invention to provide a drive apparatus for auxiliary equipment which can automatically change the speed of the auxiliary equipment in response to changes in the load applied to the auxiliary equipment or to the engine.

It is yet another object of the present invention to provide a drive apparatus for auxiliary equipment which can maintain the speed of the auxiliary equipment at a constant level even when the speed of the engine is changing.

It is a further object of the present invention to provide a drive apparatus for auxiliary equipment which is extremely compact, the mechanical parts of which are entirely housed within a drive pulley of conventional dimensions.

A drive apparatus according to the present invention employs a planetary cone-type reduction gear to transmit the rotation of the crank shaft of an engine to a drive pulley for engine auxiliary equipment and provide speed reduction in a stepless manner. The reduction ratio of the reduction gear can be continuously adjusted by changing the position of contact between an output ring and the surfaces of the planetary cones of the reduction gear. An oil pump driven by the rotation of the pulley pumps transmission oil which is sealed within the pulley to produce hydraulic pressure which acts on a ram which changes the position of contact of the output ring. The hydraulic pressure acting on the ram is determined by the opening and closing of a solenoid valve, which is controlled by a controller in accordance with the operating conditions of the engine and the auxiliary equipment. The reduction gear, the pump, the ram, and the solenoid valve are all housed within a pulley housing of the same dimensions as a conventional drive pulley for auxiliary equipment.

BRIEF DESCRIPTION OF THE DRAWINGS

FIG. 2 is a block diagram illustrating a control system for the mechanical portions illustrated in FIG. 1.

FIG. 3 is an enlarged view of a portion of the planetary cone-type reduction gear shown in FIG. 1.

FIG. 4 is a graph illustrating the relationship between drive pulley speed and engine speed during the operation of the present apparatus.

In the figures, the same reference numerals indicate the same or corresponding parts.

DESCRIPTION OF THE PREFERRED EMBODIMENT

Figure 1:
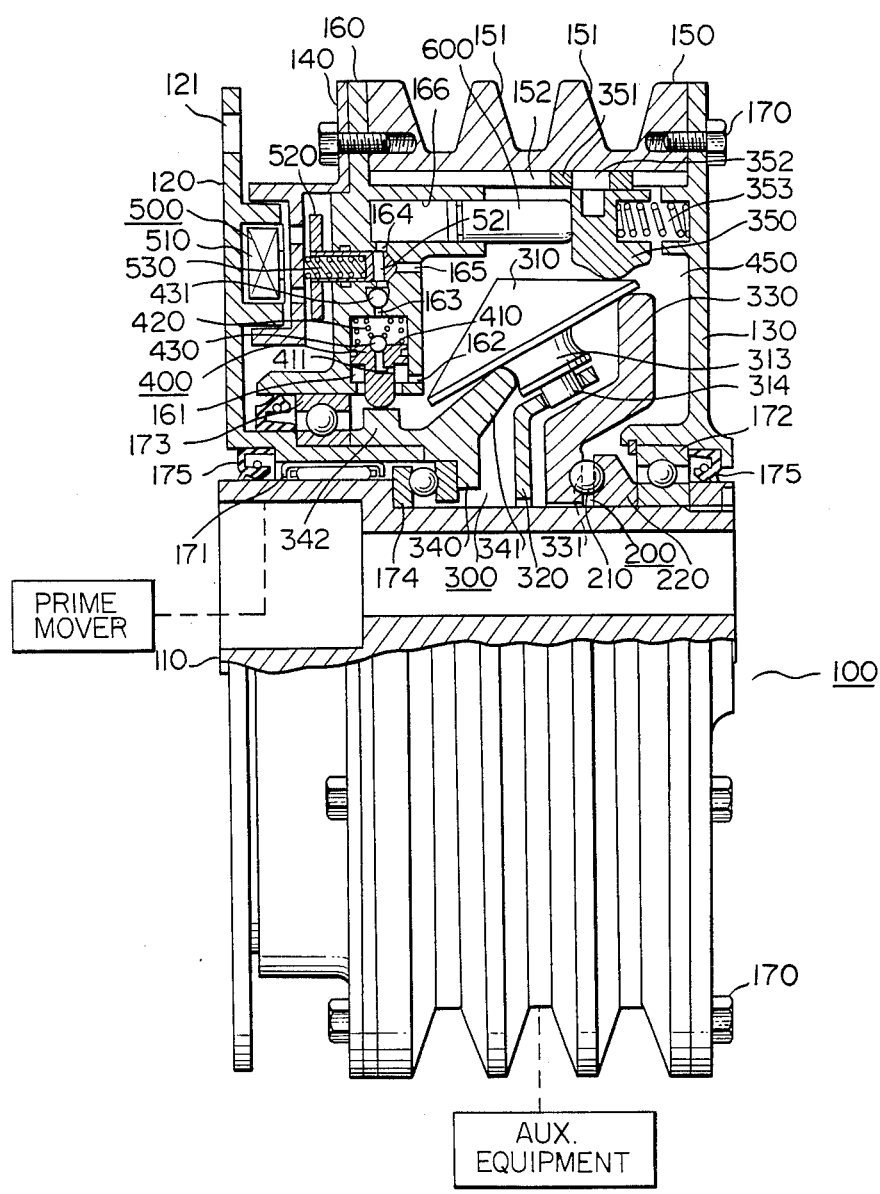
FIG. 1 is a partially cross-sectional profile of the mechanical portions of an embodiment of a drive apparatus for engine auxiliary equipment according to the present invention.

Hereinbelow, an embodiment of the present invention will be explained while referring to the accompanying drawings. As shown in FIG. 1, which is a partially cross-sectional profile of the mechanical portions of this embodiment, a drive pulley 100 has housed therein a transmission mechanism 200, a reduction gear 300, an oil pump 400, a solenoid valve 500 which controls the flow of oil from the pump 400, and a hydraulic ram 600 which is used to adjust the reduction ratio of the reduction gear 300.

The pulley 100 has at its center a hollow axle 110 which serves as an input member. The axle 110 has a shape such that it can be mounted on the crank shaft of a engine so as to rotate therewith and is supported by a stationary frame 120 through roller bearings 171. The stationary frame 120 comprises a disk-shaped flange and a cylindrical portion extending perpendicularly to the flange. The stationary frame 120 can be secured to the engine by bolts which pass through bolts holes 121 formed in the outer periphery of the flange. The axle 110 and the stationary frame 120 together support the rotating outer portion of the pulley 100 which surrounds the axle 110. This rotating portion of the pulley 100 serves as an output member and will be referred to as the body of the pulley 100. The body comprises a first end plate 130, a second end plate 140, a cylindrical grooved member 150, and an internal support frame 160 which supports the pump 400, the solenoid valve 500, and the ram 600. The first end plate 130 is rotatably supported by the end of the axle 110 which is remote from the stationary frame 120 through a ball bearing 172 and confronts the second end plate 140 which is disposed near the stationary frame 120. The second end plate 140 is supported by the inner support frame 160, which is rotatably supported by the cylindrical portion of the stationary frame 120 through a ball bearing 173. The cylindrical grooved member 150 has a plurality of grooves 151 for drive belts formed in its outer peripheral surface, and at a plurality of locations along its inner peripheral surface, it has longitudinally-extending keyways 152 whose purpose will be described further on. The cylindrical grooved member 150 is supported between the first end plate 130 and the internal support frame 160. The first end plate 130 is secured to one end of the grooved member 150, and the second end plate 140 and the internal support frame 160 are secured to the other end by screws 170 so that a liquid-tight central cavity is formed inside the grooved member 150 between the first end plate 130 and the internal support frame 160. This cavity is filled with transmission oil 450, and packing rings 175 are provided at a number of locations between parts undergoing relative motion to prevent leakage of the oil 450.

The rotation of the axle 110 with the crank shaft of the engine on which it is mounted is transmitted to the rotating body of the pulley 100 by the transmission mechanism 200 and the reduction gear 300, both of a type known in the art. The transmission mechanism 200 comprises a number of balls 210 disposed at intervals around the axle 110 between a first race 220 and a second race 331, the second race 331 constituting the radially inner portion of the input ring 330 of the reduction gear 300. The first race 220 is an annular member which is secured to the outer surface of the axle 110 so as to rotate therewith and which has an undulating surface formed on the side facing the second race 331. The second race 331 likewise has an undulating surface formed in the side confronting the first race 220, and the balls 210 are held between the undulations. When the first race 220 rotates with the axle 110, it exerts both a circumferential and an axial force on the second race 331 through the balls 210, causing the input ring 330 to rotate and to be pushed in the axial direction of the axle 110.

The reduction gear 300 is of the planetary cone type. A cone 310 has an axle 314 which is rotatably mounted in a hole formed in the outer periphery of a support ring 320 so that the cone 310 can rotate about its axis. Although FIG. 1 shows only a single cone 310, there are a number of identical cones 310 disposed in the same manner as the illustrated cone 310 at equal intervals along the circumference of the support ring 320. The support ring 320 has a hole formed at its center which is larger than the outer diameter of the axle 110 of the pulley 100 so as to enable it to rotate with respect to the axle 110. The outer periphery of the support ring 320 is bent with respect to the vertical so that the slope of the axis of the cone 310 with respect to the vertical is equal to the slope of the top surface 311 of the cone 310 with respect to the base of the cone 310, as shown in FIG. 3. The input ring 330 which has the previously-described second race 331 formed near its radially inner end and which has a hole at its center surrounds the axle 110. There is enough clearance between the outer surface of the axle 110 and the inner surface of the hole in the input ring 330 such that the two can rotate with respect to one another and also such that the input ring 330 can be moved in the axial direction along the axle 110. The radially outer end of the input ring 330 is in rolling contact with the bottom surface 312 of the cone 310.

A stationary guide member 340 has a generally cylindrical portion and a guiding portion 341 which flares diagonally outwards from the cylindrical portion towards the cones 310. The cylindrical portion is rigidly secured to the stationary frame 120. The outer end of the guiding portion 341 is in rolling contact with the stem 313 of each cone 310. The surfaces of contact between the guiding portion 341 and the stems 313 are preferably curved in a complementary manner so as to provide better rolling contact therebetween. A ball bearing 174 is provided between the guide member 340 and the axle 110 of the pulley 100. The cylindrical portion of the guide member 340 has a plurality of cams 342 in the form of radial projections formed at equal intervals along its outer periphery. These cams 342 are for the purpose of driving the pump 400, as will be explained further on.

The rotation of the cones 310 is transmitted to the grooved member 150 of the pulley 100 by an output ring 350. The radially inner surface of the output ring 350 is in rolling contact with the top surface 311 of each of the cones 310. The output ring 350 is connected to the grooved member 150 through a number of ring-shaped keys 351 which are rotatably mounted on pins 352 secured to the output ring 350 at intervals along its circumference and which are able to slide in the previously-mentioned keyways 152 formed in the grooved member 150. Rotational force applied to the output ring 350 is transmitted to the grooved member 150 of the pulley 100, through the keys 351 but at the same time the output ring 350 is able to slide in the axial direction with respect to the grooved member 150. A number of compression springs 353 disposed between the output ring 350 and the first end plate 130 bias the output ring 350 away from the first end plate 130.

The pump 400 comprises a piston 410 which is disposed inside a cylinder 161 formed in the internal support frame 160 and which can slide back and forth inside the cylinder 161. A compression spring 420 is disposed between the top surface of the piston 410 and the upper end of the cylinder 161 and exerts a radially inwards force on the piston 410 so that the bottom, rounded end of the piston 410 will always be pressed against the outer periphery of the stationary guide member 340. The bottom end is in sliding contact with the guide ring 340, and the revolution of the piston 410 about the axis of the axle 110 of the pulley 100 causes the piston 410 to move up and down inside the cylinder 161 as the bottom end rides over the cams 342 formed in the guide member 340. The piston 410 has an oil inlet 411 formed in its center which communicates between the top and bottom surfaces of the piston 410. An oil supply passageway 162 which communicates with the inside of the cylinder 161 is formed in the side of the internal support frame 160 near its bottom end. A first ball valve 430 seats on the upper end of the oil inlet 411 and serves to close it off when the piston 410 is moving upwards and to allow the inlet 411 to open when the piston 410 is moving downwards. A second ball valve 431 is disposed inside an oil passageway 163 formed in the internal support frame 160 between the cylinder 161 for the piston 410 and a cylinder for the solenoid valve 500.

The solenoid valve 500 which controls the flow of oil 450 from the pump 400 comprises a solenoid coil 510 which is secured to the stationary frame 120 and an armature 520 which can be moved back and forth by the magnetic force produced by the coil 510. The armature 520 has a cylindrical portion which is slidably housed within a cylinder formed in the internal support frame 160 and a disk-shaped portion which is mounted on the end of the cylindrical portion which is nearest the coil 510. The cylinder for the cylindrical portion of the armature 520 connects with the cylinder 161 for the pump 400 via the oil passageway 163, with the inner cavity of the pulley 100 surrounding the reduction gear 300 via a bypass 165, and to a cylinder 166 for the ram 600 via another oil passageway 164. The end of the cylindrical portion of the armature 520 distant from the disk-shaped portion has a through hole 521 formed therein. This end is shaped such that when the cylindrical portion is pushed all the way into the cylinder for the armature 520, the cylinder 161 for the pump 400 communicates with the cylinder 166 for the ram 600 via oil passageway 163, the through hole 521, and oil passage 164 while one end of the bypass 165 is sealed off. The cylindrical portion of the armature 520 is hollow for much of its length. A compression spring 530 is housed within the hollow center with one end contacting the second end plate 140. This spring 530 exerts a biasing force on the armature 520 which normally pushes the cylindrical portion of the armature 520 all the way into the cylinder. However, when a current is passed through the coil 510, the resulting magnetic force produced by the coil 510 acts on the disk-shaped portion of the armature 520, drawing the armature 520 to the left towards the coil 510 and out of the cylinder, thereby allowing fluid communication between the bypass 165 and the oil passageways 163 and 164.

The ram 600 is slidably disposed within the previously-mentioned cylinder 166 formed in the internal support frame 160. The position of the ram 600 in the cylinder 166 is determined by the magnitude of the oil pressure acting on its left end and the force of the spring 353 which produces a force acting on its right end through the output ring 350 with which it contacts. By changing the oil pressure within the cylinder 166, the position of the ram 600 and thus the position of the output ring 350 can be controlled.

FIG. 2 is a block diagram of a controller 700 for the mechanical parts illustrated in FIG. 1. As it is desirable to control the rotational speed of the pulley 100 in accordance with the operating conditions of both the engine and the auxiliary equipment, the controller 700 includes detectors which are responsive to these operating conditions. A drive pulley rotational speed detector 710 detects the actual rotational speed of the pulley 100 and produces a corresponding electrical output signal. A charging generator load current detector 720 produces an electrical output signal corresponding to the load current of the charging generator of the vehicle, which is driven by the pulley 100. Similarly, a compressor load detector 730 produces an electrical output signal corresponding to the load of the compressor for the air conditioner of the vehicle which is driven by the pulley 100. An engine cooling water temperature detector 740 produces an electrical output signal corresponding to the temperature of the engine cooling water. An engine sudden acceleration detector 750 detects when the engine is accelerating and produces a corresponding electrical output signal. The electrical output signals from the detectors 720-750, which indicate the operating conditions of the engine and the auxiliary equipment, are input to an operating speed calculator 760, which, based on these input signals, calculates the optimal rotational speed of the pulley 100 and produces a corresponding output signal. The output signals from from the drive pulley rotational speed detector 710 and the operating speed calculator 760 are input to a comparator 770, which produces an output signal corresponding to the difference. This output signal is input to a solenoid valve control circuit 780, which controls the current flowing through the coil 510 of the solenoid valve 500 so as to control the speed of the pulley 100.

The operation of the embodiment illustrated in FIGS. 1 and 2 will now be described. The rotation of the axle 110 which turns with the crank shaft of the engine on which it is mounted is transmitted to the input ring 330 via the transmission 200, causing the input ring 330 to rotate about the axis of the axle 110. The rotation of the input ring 330 causes each cone 310 with which it contacts to rotate about its own axis. As each cone 310 is in rolling contact with the stationary guide member 340, each cone 310 is forced to perform planetary movement about the axle 110 at the same time that it rotates about its own axis. The rotation and revolution of the cones 310 causes the rotation of the output ring 350 about the axis of the axle 110, and the rotational force exerted on the grooved portion 150 of the pulley 100 through the ring-shaped keys 351 causes the body of the pulley 100 to rotate about the axis of the axle 110 but at a rate less than the axle 110 itself.

As the body of the pulley 100 rotates about the axle 110, the piston 410 is moved up and down in the cylinder 161 in which it is housed as the bottom end of piston 410 rides over the cams 342 formed around the periphery of the stationary guide member 340, pumping transmission oil 450 from the internal cavity surrounding the reduction gear 300 through the oil passageway 162 and the oil inlet 411. The path taken by the oil 450 pumped by the piston 410 is determined by the position of the armature 520 of the solenoid valve 500. When no current is passed through the coil 510 of the solenoid valve 500, the bypass 165 is closed off and oil 450 can only flow into the cylinder 166 for the ram 600. However, if current is passed through the coil 510, the armature 520 is drawn towards the coil 510, opening the bypass 165 and enabling oil 450 to flow from the oil passageway 163 back into the internal cavity via the bypass 165.

The rotational speed of the pulley 100 is determined by the reduction ratio of the reduction gear 300. As can be seen from consideration of FIG. 3, the reduction ratio is determined by the distance from the apex of each cone 310 of the point of contact between the top surface 311 of the cone 310 and the output ring 350. The reduction ratio of the reduction gear 300 is expressed by the following formula:

$$1 - N2/N1 = 1 - d(ec + fa)/c(ed + fb)$$

wherein N1 is the rotational speed of the axle 110;

N2 is the rotational speed of the grooved portion 150 of the pulley;

a is the distance from the axis of each cone 310 to the point of contact between the top surface 311 of the cone 310 and the output ring 350;

b is the distance from the axis of the cone 310 to the point of contact between the bottom surface 312 of the cone 310 and the input ring 330;

c is the distance from the axis of the axle 110 to the point of contact between the top surface 311 of the cone 310 and the output ring 350;

d is the distance from the axis of the axle 110 to the point of contact between the bottom surface 312 of the cone 310 and the input ring 330;

e is the distance from the axis of the cone 310 to the point of contact between the stem 313 of the cone 310 and the guide portion 341; and f is the distance from the axis of the axle 110 to this same point of contact.

Since the values of b through f are fixed, the reduction ratio can be varied by changing a, which can be done by adjusting the position of the ram 600.

By turning on and off the solenoid valve 500, the oil pressure acting on the left end of the ram 600 can be controlled, thereby controlling the position of the point of contact between the output ring 350 and the top surface 311 of the cone 310. If the oil pressure in the cylinder 166 for the ram 600 is increased, the ram 600 and the output ring 350 will be pushed to the right by the increased oil pressure acting against the force of the compression springs 353, while if the oil pressure in the cylinder 166 is decreased by the operation of the solenoid valve 500, the ram 600 and the output ring 350 will be pushed to the left by the springs 353 until the force of the springs 353 balances the hydraulic force acting on the left end of the ram 600.

The operating speed calculator 760 of the controller 700 automatically determines the optimal rotational speed of the pulley 100 based on the operating conditions of the engine and the auxiliary equipment being driven by the pulley 100, based on the electrical output signals of the detectors 720-750. If the comparator 770 determines that the actual rotational speed of the pulley 100 as determined by the pulley rotational speed detector 710 is less than the optimal rotational speed determined by the operating speed calculator 760, the solenoid valve control circuit 780 controls the coil 510 of the solenoid valve 500 so as to increase the hydraulic pressure acting on the left end of the ram 600, moving the output ring 350 to the right and increasing the rotational speed of the pulley 100. Conversely, if the comparator 770 determines that the actual rotating speed is higher than the optimal speed determined by the operating speed calculator 760, the solenoid valve control circuit 780 acts to decrease the hydraulic pressure acting on the left end of the ram 600, thereby moving the output ring 350 to the left and decreasing the rotational speed of the pulley 100 until it matches the calculated optimal rotational speed.

Accordingly, the pulley 100 can always be driven at the optimal speed regardless of the engine speed. This is shown schematically in FIG. 4, which is a graph of the rotational speed of the pulley 100 as a function of the engine speed. At Points A, B, and C, when the engine speed is low, the pulley 100 can be controlled to rotate at the same speed as the engine. However, as the engine speed increases towards the value at Points A', B', or C', the rotational speed of the pulley 100 can be controlled to the same level as at Point A, B, or C.

Because the output ring 350 can be moved to any position along the top surface 311 of the cone 310, continuous, stepless adjustment of the reduction ratio of the reduction gear 300 is possible. Accordingly, changes in the rotational speed of the pulley 100 can be effected extremely smoothly without imparting any shocks to the engine or the auxiliary equipment. Also, as the reduction gear 300 is of the planetary cone type, its operation is extremely quite.

Furthermore, as the auxiliary equipment can be driven at a low speed even when the engine is running at a high speed, the power losses due to the auxiliary equipment can be limited and the fuel efficiency of the engine is increased.

Because all of the mechanical parts of the present invention fit into a drive pulley 100 having the same size as a conventional drive pulley for auxiliary equipment, it is possible to employ the present invention even in automobiles having a very limited installation space, such as in front-wheel drive automobiles.

The controller 700 illustrated in FIG. 2 has detectors (720-740) for only three pieces of auxiliary equipment which are driven by the drive pulley 100. However, it is possible to have the controller 700 include detectors for additional or different pieces of auxiliary equipment, on the basis of the electrical output signals of which the operating speed calculator 760 determines the optimal rotational speed of the pulley 100.

The present embodiment employs a pulley 100 to drive auxiliary equipment. However, by replacing the grooves 151 formed in the grooved member 150 of the pulley 100 by sprockets gear teeth, or the like, it is possible to transmit drive force to auxiliary equipment by means other than a pulley drive belt.

Furthermore, the axle 110 of the pulley 100 need not be driven by an automobile engine but can be driven by an electric motor or other type of prime mover, and the equipment to be driven need not be the auxiliary equipment of an automobile. Thus, the present invention can be used in various application not related to automobiles.

What is claimed is:

1. A drive apparatus for driving auxiliary equipment of a prime mover comprising:

a rotating input member driven by said prime mover;

a hollow, rotating output member surrounding and supported by said input member for rotating with respect to said input member;

an adjustable, planetary cone-type reduction gear housed within said hollow output member and having a rotating input portion connected for rotation by said input member and having a rotating output portion connected so as to rotate said hollow output member;

adjusting means for adjusting the reduction ratio of said reduction gear, said adjusting means being housed within said hollow output member; and control means for controlling said adjusting means in response to the operating state of said auxiliary equipment driven by said output member.

2. A drive apparatus for driving auxiliary equipment of a prime mover comprising:

a rotating input member driven by said prime mover;

a hollow, rotating output member surrounding and supported by said input member for rotating with respect to said input member;

an adjustable, planetary cone-type reduction gear housed within said hollow output member and having a rotating input portion connected for rotation by said input member and having a rotating output portion connected so as to rotate said hollow output member;

said reduction gear including a plurality of cones, each having a stem, a bottom surface, and a top surface, a rotating support member surrounding and supported by said input member and rotatably supporting each of said cones about its axis, and a stationary guide member in rolling contact with said stem, said input portion being in rolling contact with said bottom surface of each of said cones and said output portion being in rolling contact with said top surface of each of said cones, said output portion being slidably connected to said hollow output member so as to be moved in an axial direction of said input member while maintaining rolling contact with the top surface of each of said cones;

adjusting means for adjusting the reduction ratio of said reduction gear housed within said hollow ouput member;

said adjusting means comprising an hydraulic pump, an hydraulic ram having one end in fluid communication with said hydraulic pump and the other end contacting said output portion to allow hydraulic pressure generated by said hydraulic pump to provide a driving force pushing said hydraulic ram against said output portion in said axial direction of said input member, a spring disposed inside said pump for applying a compression force on said output portion in a direction opposite to said axial direction of said driving force applied by said hydraulic ram, and valve means for controlling the hydraulic pressure applied to said hydraulic ram by said hydraulic pump; and control means for controlling said adjusting means in response to the operating state of said auxiliary equipment driven by said output member.

3. A drive apparatus as claimed in claim 2 wherein said control means comprises operating condition detecting means for detecting the operating conditions of said prime mover and of said auxiliary equipment and producing corresponding electrical outputs, speed detecting means for detecting the rotational speed of said hollow output portion, calculating means for calculating an optimal rotational speed of said hollow output portion based on the outputs of said operating condition detecting means, comparator means for comparing the actual rotational speed and the optimal rotational speed and producing a corresponding electrical output in response to the comparison, and valve control means for controlling the opening and closing of said valve means in accordance with the output from said comparator means.

4. A drive apparatus as claimed in claim 2 wherein:

said stationary guide member includes a plurality of cams extending radially outwards from the axial center of said input member;

said hollow output member includes a radiallyextending piston cylinder having an oil inlet and an oil outlet; and said hydraulic pump comprises a piston housed in said piston cylinder and having a radially inner end in sliding contact with said cams, and a biasing spring exerting a radially inwards biasing force on said piston, the rotation of said output member with respect to said stationary guide member causing said piston to be moved radially inwards and outwards by said cams.

5. A drive apparatus as claimed in claim 4 wherein:

said hollow output member includes a valve cylinder formed therein, a ram cylinder for said hydraulic ram, a first oil passageway for communicating between said valve cylinder and the oil outlet of said piston cylinder, a second oil passageway for communicating between said valve cylinder and said ram cylinder, and an oil bypass for communicating between said valve cylinder and the oil inlet of said piston cylinder; and said valve means is a solenoid valve comprising a solenoid coil, an armature slidably disposed inside said valve cylinder and capable of sliding between a closed position and an open position, and a biasing spring for exerting a biasing force on said armature in a direction opposite to the direction of the magnetic force acting on said armature when said solenoid coil is energized, said armature preventing fluid communication between said oil passageways and said oil bypass when in said closed position and permitting fluid communication between said oil passageways and said oil bypass when in said open position.

6. A drive apparatus as claimed in claim 5 wherein said hollow output member is filled with transmission oil, and said oil bypass is in fluid communication with said oil inlet of said piston cylinder via the hollow inner portion of said output member.

7. A drive apparatus as claimed in claim 6 wherein said hollow output member has a pulley groove for a drive belt formed in its outer surface and said prime mover is an automobile engine, the crank shaft of which is drivingly connected to said input member.

* * * * *